United States Patent [19]

Brown

[11] 4,227,959
[45] Oct. 14, 1980

[54] SONIC OR ULTRASONIC APPARATUS FOR SIMULTANEOUSLY CUTTING AND SEAMING SHEET MATERIAL

[75] Inventor: Abner D. Brown, Elkin, N.C.

[73] Assignee: Chatham Manufacturing Company, Elkin, N.C.

[21] Appl. No.: 973,575

[22] Filed: Dec. 27, 1978

[51] Int. Cl.² .................. B23K 27/02; B23K 27/08
[52] U.S. Cl. ................................. 156/515; 156/73.3; 156/553; 156/580.2; 228/1 B
[58] Field of Search ............. 156/73.1, 73.3, 510, 156/515, 580.1, 580.2, 553; 228/1 R, 1 B

[56] References Cited

U.S. PATENT DOCUMENTS

| 3,378,429 | 4/1968 | Obeda | 156/580.2 X |
|---|---|---|---|
| 3,679,526 | 7/1972 | Horton | 156/73.3 X |
| 3,733,238 | 5/1973 | Long et al. | 156/73.1 X |
| 3,756,880 | 9/1973 | Graczyk | 156/73.3 |
| 3,837,977 | 9/1974 | Rust, Jr. | 156/73.1 X |
| 3,852,144 | 12/1974 | Parry | 156/73.3 X |

*Primary Examiner*—Michael G. Wityshyn
*Attorney, Agent, or Firm*—Cushman, Darby & Cushman

[57] ABSTRACT

A sonic or ultrasonic apparatus for exposing sheet material having a heat fusible component disposed therein to high frequency vibrational or mechanical energy to perform an operation thereon. The apparatus includes a plurality of electro-acoustical converter units, each of which is energized by high frequency electrical energy that is converted into high frequency vibrational energy. The units are horizontally spaced in juxtaposition to each other in line transversely above the sheet material, and each electro-acoustical converter unit has a horn resonant at the high frequency vibrational energy which opposes stationary anvil means positioned beneath the sheet material. The horns are simultaneously moved vertically downwardly from an indexing position into engagement with the sheet material and then horizontally in a small increment while in engagement to perform the operation on the sheet material and then vertically upwardly and horizontally back to the initial indexing position for a next operation on the sheet material. The anvil means, which is stationary, permits the horns to simultaneously cut the sheet material and seam the cut edges by producing fusion bonds along the cut edges. Alternatively, the anvil means can be arranged to either provide an elongated seam transversely across the sheet material or provide an elongated transverse cut in the sheet material.

41 Claims, 25 Drawing Figures

SONIC OR ULTRASONIC APPARATUS FOR SIMULTANEOUSLY CUTTING AND SEAMING SHEET MATERIAL

The present invention relates to improvements in sonic or ultrasonic apparatus utilized for exposing sheet material having a heat fusible component disposed therein to high frequency vibrational or mechanical energy for performing an operation on the sheet material. More particularly, the present invention relates to an apparatus of the type utilizing a plurality of electroacoustical converter units, each for converting electrical energy into high frequency vibrational or mechanical energy, the units each having horns resonant at the high frequency vibration or mechanical energy, the horns having elongated frontal surfaces opposed to a stationary anvil means. The frontal surfaces of the horns are closely spaced with each other in a line which extends transversely across the sheet material. Means are provided to vertically adjust the operating position of each of the horns and further means are provided for simultaneously moving all of the horns and their respective electro-acoustical converter units from an indexing position vertically downwardly into engagement with the sheet material and then horizontally a small increment to perform the operation on the sheet material and then vertically upwardly and horizontally back to the indexing position. The operation on the sheet material by the apparatus may be a simultaneous cutting and seaming along the edges cut of the sheet material or it may be an individual cutting of the sheet material, or it may be providing an elongated fusion bond seam transversely across the sheet material.

BACKGROUND OF THE INVENTION

In recent years sonic or ultrasonic apparatus have found increasing use for performing operations on sheet material having at least some heat fusible components disposed therein, the heat fusible material being either thermoplastic or thermosetting. In this respect, the apparatus were utilized to subject high frequency vibrational energy resulting from sonic or ultrasonic energy to the sheet material for the purpose of seaming or welding, cutting, embossing and the like. Usually, the sheet material is a single layer which is to be cut and/or seamed or embossed with a design, or it may be multiple layers which are welded together by fusion bonds.

When the sheet material is a textile fabric or the like and at least some of the fibers of the sheet material are thermoplastic or thermosetting components, apparatus have been utilized to provide a seam along a selvage of the textile fabric or a seam transverse to the textile fabric. Additionally, such apparatus have been used for simultaneously cutting and seaming the edges formed by the cut when the textile fabric is cut in lengths for use in the manufacture of blankets, and in this instance the cut and the seams have been made transversely across the textile fabric as it is fed from a beam or the like to the cutting station of the apparatus. Usually the electroacoustical converter unit with its horn and its cooperating anvil are moved relative to the material to make the cut and/or seam, and since the material is in widths of 90 inches or more, the operation of cutting and/or seaming requires considerable time at the cutting and seaming station. In other words, the electro-acoustical converter unit and its horn, together with the cooperating anvil, had to be moved across the entire width of the textile fabric to progressively make the cut and/or seams before the textile fabric could be advanced to a new position for the next operation.

PRIOR ART

Prior art arrangements relating to, but not suggesting, the present invention are disclosed in the following United States patents:

| | | |
|---|---|---|
| 3,378,429 | Obeda | April 16, 1968 |
| 3,526,554 | Obeda | Sept. 1, 1970 |
| 3,553,059 | Stohlquist | Jan. 5, 1971 |
| 3,679,526 | Horton | July 25, 1972 |
| 3,733,238 | Long et al | May 15, 1973 |
| 3,737,361 | Obeda | June 5, 1973 |
| 3,764,442 | Parry | Oct. 9, 1973 |
| 3,852,144 | Parry | Dec. 3, 1974 |
| 3,970,509 | Vitale | July 20, 1976 |
| 3,973,066 | Smith et al | Aug. 3, 1976 |

In some of the above-mentioned patents the electroacoustical converter unit and its horn, together with the cooperating anvil, are mounted on a frame structure which horizontally moves the unit and the anvil transversely of the sheet material to progressively cut the same into predetermined lengths. The apparatus not only cuts the sheet material into predetermined lengths but provides means for seaming the edges formed by the cut. Other of the above patents disclose apparatus wherein cuts and seams are simultaneously made but in these apparatus the sheet material or workpiece is fed between the horn and anvil rather than having the horn and anvil movable and such apparatus would be used to form a selvage on the sheet material. Still other of the above-mentioned patents disclose arrangements for forming seams across the sheet material by utilizing a fixed position horn with a rotating anvil and with the material passing between the horn and the anvil, the design of the anvil providing a particular pattern of fusion bonds or welds.

BRIEF SUMMARY OF THE INVENTION

The present invention is an improvement in apparatus for exposing sheet material to high frequency vibrational energy to perform an operation on sheet material having at least a heat fusible component disposed therein. The apparatus utilizes sonic or ultrasonic energy to perform either a seaming operation or a cutting operation or simultaneously both a seaming and cutting operation, the operations being accomplished by converting high frequency electrical energy into high frequency vibrational or mechanical energy whereby the heat resulting from the high frequency vibrational or mechanical energy causes fusion bonding of fibers to form a seam or causes severance of the fibers when cutting is desired. The apparatus operates on the entire width of the sheet material substantially at one time, thereby reducing the dwell time for making a cut and/or seam over that necessary when the cut and/or seam is progressively made across the entire width of the sheet material.

In one of the broadest aspects of the present invention, an apparatus for cutting and/or seaming sheet material transversely of the same by exposing the sheet material to high frequency vibrational energy to perform the operations thereon comprises a frame structure through which the sheet material is fed from a source, stopped and then upon which the operation is accomplished, a horizontally movable support member carried by said frame structure above the sheet material, a plurality of electro-acoustical converter units horizontally spaced in juxtaposition above the sheet material and operatively supported on the horizontally movable support member, each of the electro-acoustical converter units having a horn resonant at high frequency vibrational energy provided by the units, means to move the horns vertically downwardly into engagement with the sheet material from an indexing or starting position and then a small distance horizontally of the sheet material while in engagement therewith and then vertically upwardly and back horizontally to the indexing or starting position, and stationary anvil means disposed transversely beneath the sheet material and opposing the in-line elongated frontal surfaces of the horns, the anvil means including at least one row of closely spaced resiliently mounted pins in line with each other for seaming the sheet material and a cutter member adjacent to the in-line pins and extending transversely of the sheet material.

The horns of the electro-acoustical converter units may be vertically adjusted to provide a predetermined gap between the frontal surface of the horns and the anvil means when in an operative position but are simultaneously moved vertically.

Additionally, the present invention contemplates providing a leading bottom end on the frontal surface of each of the horns which is slightly rounded so as to allow the horn to easily move horizontally over the anvil pins while in engagement with the sheet material. Ancillary to this feature, the invention provides spring means to urge the anvil pins upwardly to a predetermined position, the anvil pins being urged downwardly slightly when the horns are in engagement with the sheet material.

A further feature of the present invention is to provide an anvil cutter member which includes a wire extending transversely of the sheet material adjacent to the row or rows of anvil pins, the cutter wire being supported on a plurality of resiliently mounted pins. Ancillary to this particular feature, it is a further feature of the present invention to provide means for controlling the tension of the cutter wire and for mounting the cutter wire so as to avoid harmonics being set up in the cutter wire by the high frequency vibrational energy from the horns.

A further feature of the present invention is to provide means for removing the sheet material from the anvil pins and/or cutter wire after the seaming and/or cutting operation has been accomplished so that the sheet material can be advanced from its source for an additional seaming and/or cutting operation.

Another broad aspect of the present invention is to provide an apparatus which will make a seam and/or cut the sheet material transversely of the same, the apparatus comprising a frame structure for receiving the sheet material and having a station therein where the operation is accomplished, a plurality of electro-acoustical converter units operatively supported on said frame structure and horizontally spaced in juxtaposition to each other in line transversely above the sheet material, each of the units being energized by high frequency electrical energy which is converted into high frequency vibrational energy and each of the units having a horn resonant at the high frequency vibrational energy, means to simultaneously move all of the horns from an initial or indexing position vertically downwardly into engagement with the sheet material and then horizontally while in engagement with the sheet material a short distance and then vertically upwardly out of engagement and horizontally back to the initial position, and stationary anvil means disposed beneath and extending transversely of the sheet material, the anvil means opposing the in-line frontal surfaces of the horns.

Ancillary to the immediately above-described feature, it is a further feature to utilize anvil means that comprise at least one row of a plurality of anvil pins biased upwardly a predetermined distance toward the frontal surface of the horns, the pins performing a seaming or welding function. Further, the anvil means may include an anvil cutter wire resiliently supported adjacent the row of pins for cooperating with the frontal surface of the horns to make a cut transversely across the entire width of the sheet material substantially at one time.

These and other features, objects and advantages of the present invention will appear more fully from the accompanying drawings and from the "DETAILED DESCRIPTION OF THE INVENTION" which follow.

BRIEF DESCRIPTION OF THE DRAWINGS

FIG. 5 is a broken away side elevational view of the apparatus illustrated in FIGS. 1 and 2;

FIG. 5a is an enlarged view of the area encircled in FIG. 5 and identified by the numeral 5a;

FIG. 6 is an enlarged fragmentary view looking in the direction of the arrow 6 in FIG. 3;

FIG. 7 is an enlarged perspective view disclosing the wire guide for the cutter wire;

DETAILED DESCRIPTION OF THE INVENTION

Referring now to the drawings wherein like character or reference numerals represent like or similar parts, there is disclosed an apparatus generally designated at 10 for exposing sheet material such as a textile fabric to sonic or ultrasonic energy and, more specifically, to an apparatus for cutting the textile fabric and seaming the edges formed. The textile fabric upon which the cutting and seaming is accomplished, is fed to a work station in the apparatus 10 from a beam or the like, and it is cut into lengths suitable for blankets. In this respect, the textile fabric may be typically 90 inches or more in width, and it is required to be cut at intervals of 72 inches in order to obtain a blanket of conventional size. The textile fabric must have at least some of its components, such as fibers or yarns, which are thermoplastic or thermosetting, or it may be made up entirely of thermoplastic or thermosetting components.

Although the invention is being disclosed for making blankets from a textile fabric, it will be understood by those skilled in the art that the textile fabric could be more than one layer where it is desirous to weld multiple layers together, for example, in the manufacture of electrical blanket shells. The term "sheet material" as used throughout the specification is broad enough to cover a single layer or multiple layers of textile fabric having at least some of its components heat fusible. The term "textile fabric" is intended to cover both woven and nonwoven textile fabrics, as well as needled textile fabrics. While the term "seam" is intended to cover fusion bonds and welds, the pattern of the seam can take on varied forms, for example, when it is desired to emboss the surface of the sheet material with a predetermined ornamental design.

Figure 1:
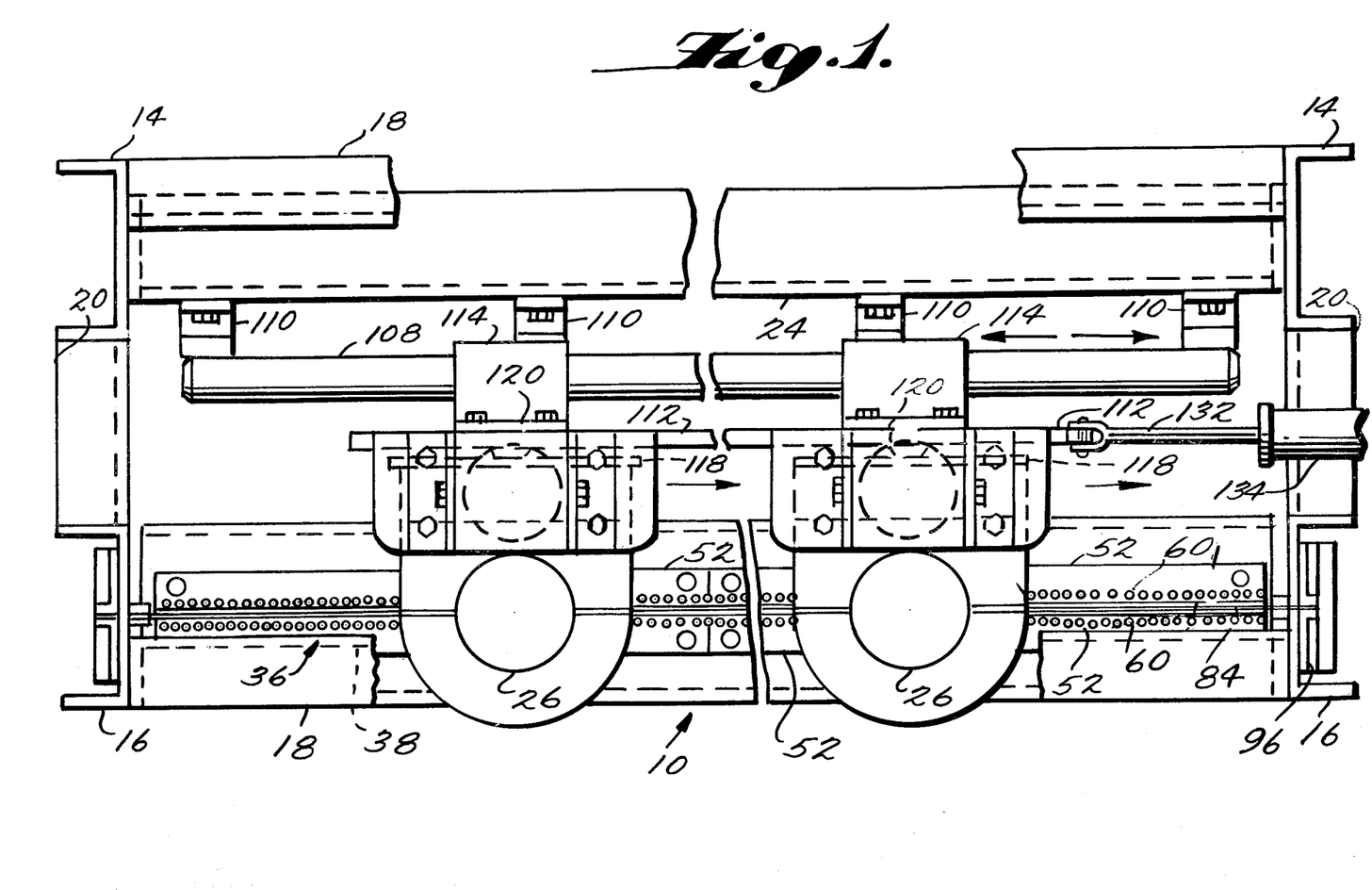
FIG. 1 is a top plan view of the apparatus of the present invention, the view being partly broken away and with portions thereof omitted for purpose of clarity.
Figure 2:
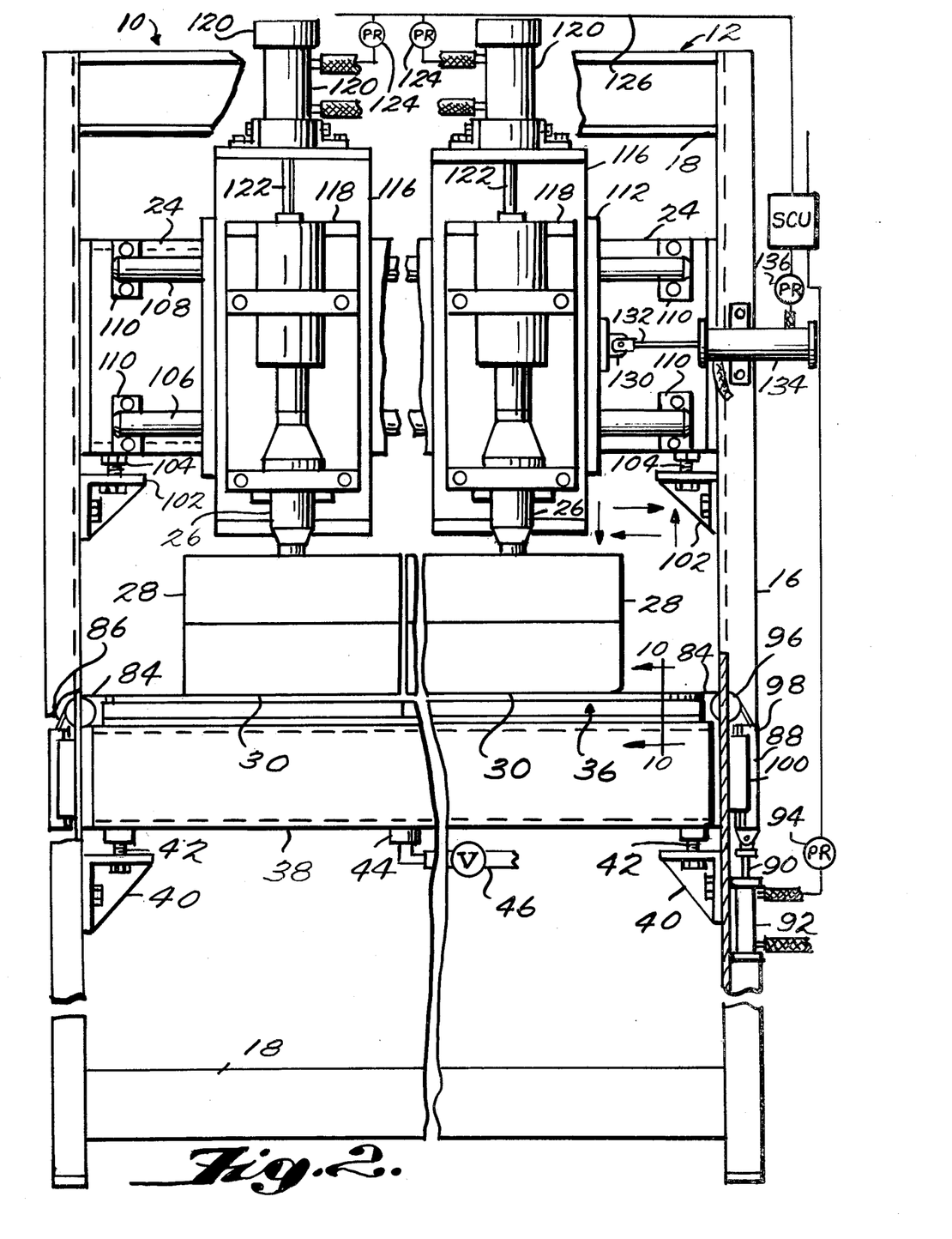
FIG. 2 is a front elevational view of the apparatus illustrated in FIG. 1, the view also being broken away.
Figures 5, 5A, 6, 7:
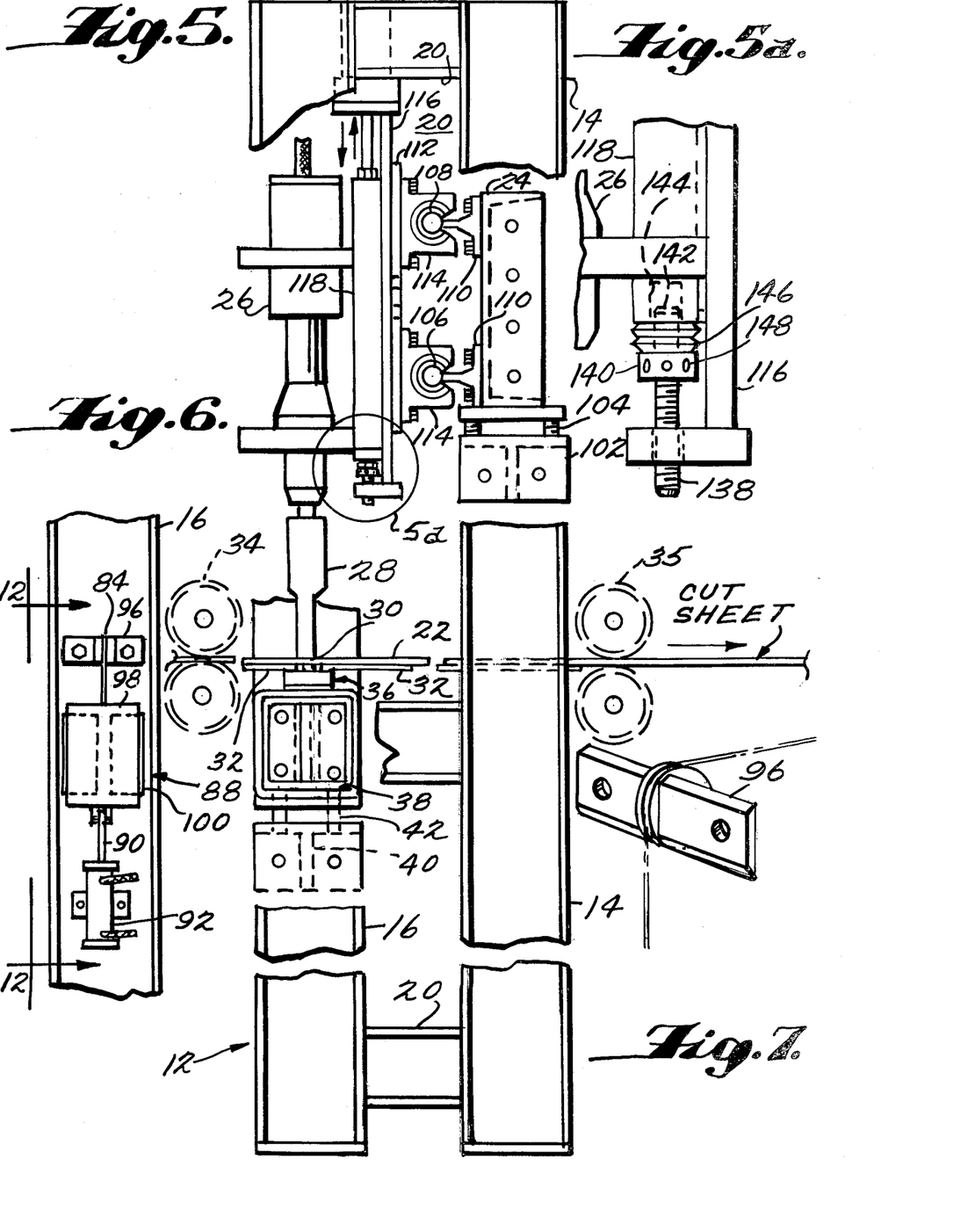

The sonic or ultrasonic apparatus 10 as shown in FIGS. 1-5, inclusive, includes a frame structure generally designated at 12, the frame structure comprising a first pair of horizontally spaced vertical standards 14 and a second pair of horizontally spaced vertical standards 16, the standards 14 and 16 being connected together by suitable cross beams 18. Additional cross beams 20 connect the first and second pairs of vertical standards 14 and 16 together as best shown in FIGS. 1 and 5. The lateral spacing between each of the vertical standards 14 and the lateral spacing between each of the vertical standards 16 is determined by the width of sheet material 22 which is to be cut into suitable lengths for blankets. In this respect, the apparatus usually has a width wide enough to receive sheet material to be cut into "king size" blankets and thus it may be 112 inches or greater.

The frame structure 12 is provided with a mounting plate or member 24 which may be of channel section and which extends between the vertical standards 14. The channel-shaped plate 24 operatively supports a plurality of electro-acoustical converter units 26, the converter units each having a horn 28 the horn 28 being elongated and having a frontal surface 30 for engaging the sheet material 22. As will be evidenced from FIGS. 1, 2 and 5, the horns 28 and their frontal surfaces 30 are in a line with each other, as are the electro-acoustical converter units 26, and extend transversely of the frame structure 12. Each horn 28 is about 9 inches in length and adjacent horns have a gap therebetween of about 0.02 inch as the horns must not touch one another when in operation. Typical electro-acoustical converter units are disclosed in U.S. Pat. Nos. 3,524,085, issued Aug. 11, 1970, to Shoh, and 3,328,610, issued June 27, 1967, to Jacke et al, and as is well known in the art, these units convert electric energy at frequencies of between 12K Hertz and 40K Hertz into mechanical or vibrational energy and, of course, the horn of a particular unit is resonant at a particular frequency for that unit. More specifically, the present invention utilizes electro-acoustical converter units manufactured by Branson Instruments, Incorporated, Stamford, Conn., and identified as Model 102 Converter and Model 160 Generator, the unit operation at 20K Hertz. It will be appreciated that since the horns have a length of about 9 inches, the apparatus will have to have at least 10 such horns to operate on a 90 inch width of sheet material and, of course, if the width is greater, there has to be enough additional horns so that the in-line frontal surfaces of the horns completely traverse the width of the textile fabric or sheet material except for the gaps between adjacent horns. However, and as will be explained in more detail later in the specification, the horns are moved a small distance horizontally while in engagement with the sheet material so that the operation performed by the horns completely traverses the sheet material.

The frame structure 12 may be provided with a platform surface 32 (FIGS. 5, 8 and 9) for supporting the sheet material 22 when it is fed from a beam or the like (not shown) by feed rollers 34 to the apparatus 10 and when the cut sheet of the sheet material 22 is removed from the apparatus take-off rollers 35. The platform surface 32 which may be made of two or more sections is provided with a gap extending transversely of the frame structure beneath the horns 28 of the electroacoustical converter units 26 and stationary anvil means generally designated at 36 is provided in this gap for cooperating with the horns 28 when the sheet material 22 is fed between the anvil means 36 and the frontal surfaces 30 of the horns 28. In more detail, the anvil means 36 is supported on a tubular member 38 extending between the vertical standards 16, the tubular member 38 being adjustably supported relative to the standards 16 by means of brackets 40 carried by the standards 16 and levelling screws 42. The upper surface of the tubular member 38 carries the anvil means 36. Tubular member 38 which is closed at its ends is provided with a fitting 44 to which an air line 46 is connected, the air line being suitably connected to a sequence control unit SCU (diagrammatically shown in FIG. 2) and, as will be explained later in the specification, air under pressure can be applied to the tubular member 38 and, in turn, fed from the tubular member through the anvil means 36 against the undersurface of the sheet material 22 for the purpose of lifting the sheet material from the anvil means after it has been cut and the edges formed by cutting have been seamed or sewn by fusion bonding.

Figures 13, 19:
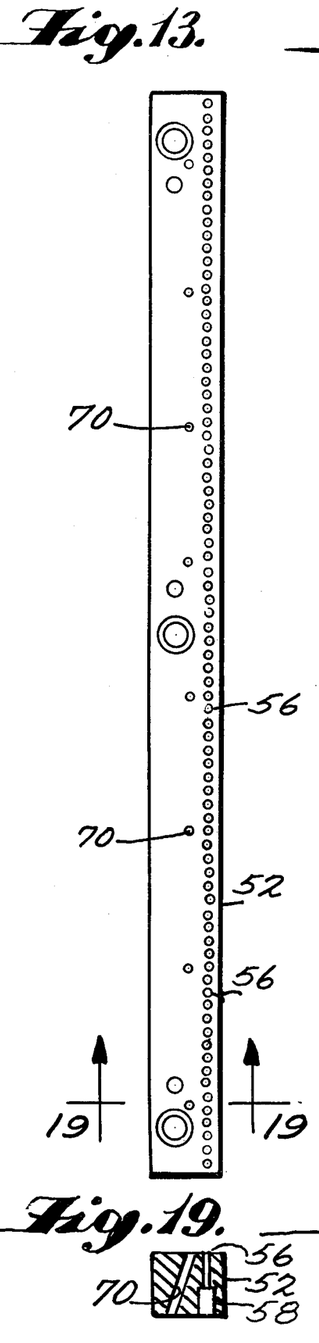
FIG. 13 is a top plan view of the pattern bar for receiving the anvil pins.
FIG. 19 is a cross-sectional view taken on the line 19—19 of FIG. 13.
Figures 14, 15, 16, 17, 18, 20:
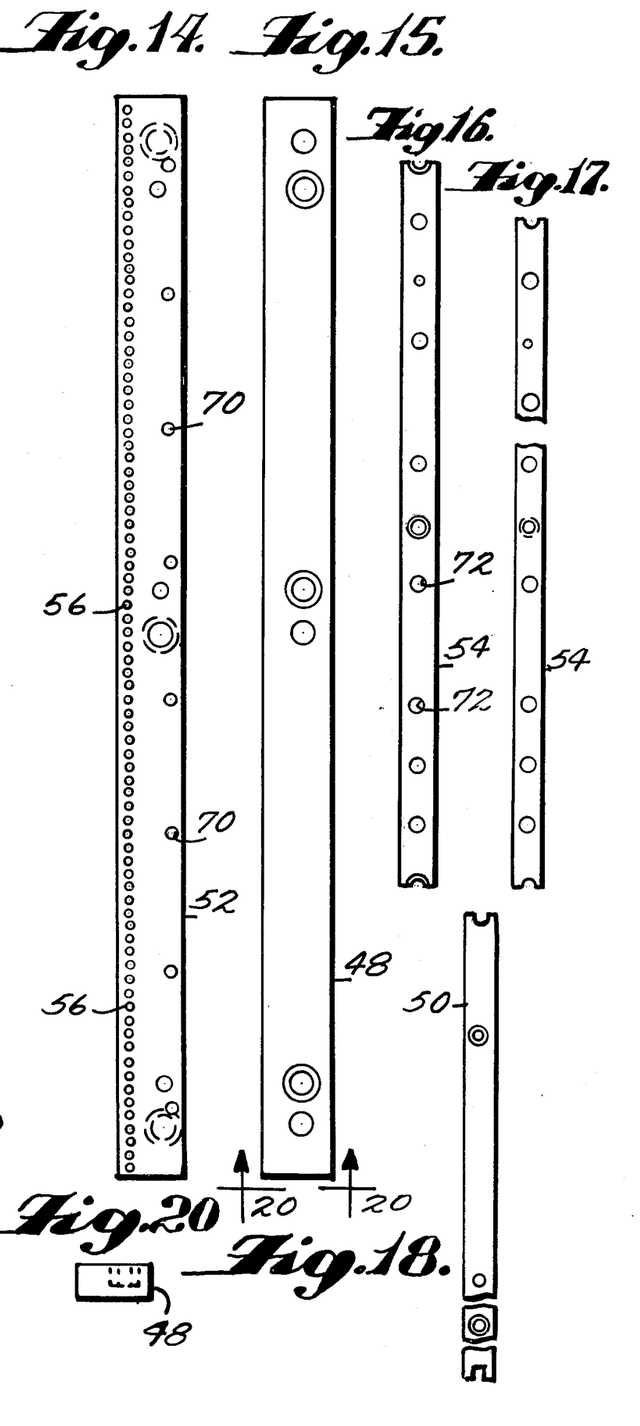
FIG. 14 is a bottom plan view of the pattern bar of FIG. 13.
FIG. 15 is a bottom plan view of the pattern bar base plate which is used with the pattern bar of FIGS. 13 and 14.
FIG. 16 is a top plan view of one of the cutter bar members which supports the mounting pins for the cutter wire.
FIG. 17 is a bottom plan view of the cutter bar member of FIG. 16.
FIG. 18 is a fragmentary bottom plan view of the cutter bar base plate.
FIG. 20 is a view taken on the line 20—20 of FIG. 15.

The anvil means 36 not only cuts the sheet material but it also simultaneously provides a seam along each edge of the sheet material when the cut is made. To accomplish this, the anvil means 36 includes a pair of spaced pattern bar base plates 48 (FIGS. 15 and 20) and a cutter bar base plate 50 (FIG. 18) interposed therebetween. The base plates 48 and the cutter bar base plate 50 are preferably made up in a plurality of short sections. Carried on each of the base plates 48 is a pattern bar 52 (FIGS. 13, 14 and 19) whereas a cutter bar 54 (FIGS. 16 and 17) is carried on the cutter bar base plate 50. The bars 52 and 54 may be made up in short sections which extend transversely across the frame structure 12.

Figure 8:
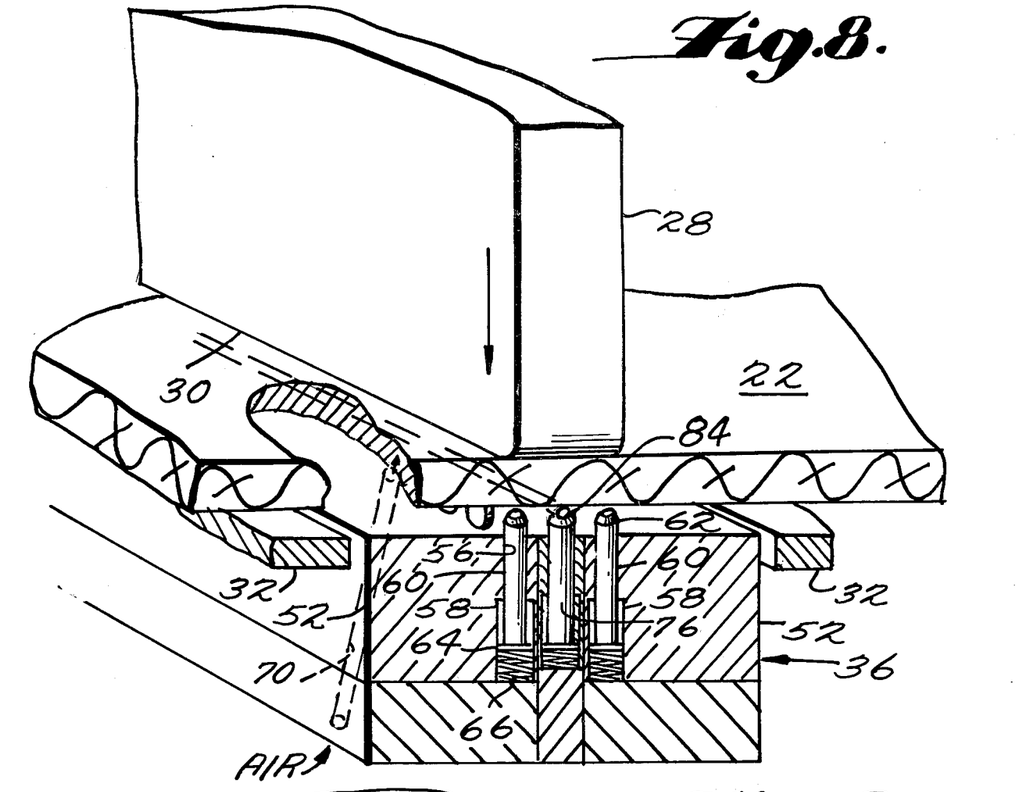
FIG. 8 is an enlarged perspective view partly in section illustrating the horn of one of the electro-acoustical converter units in its upper position just prior to engagement with the sheet material.
Figure 9:
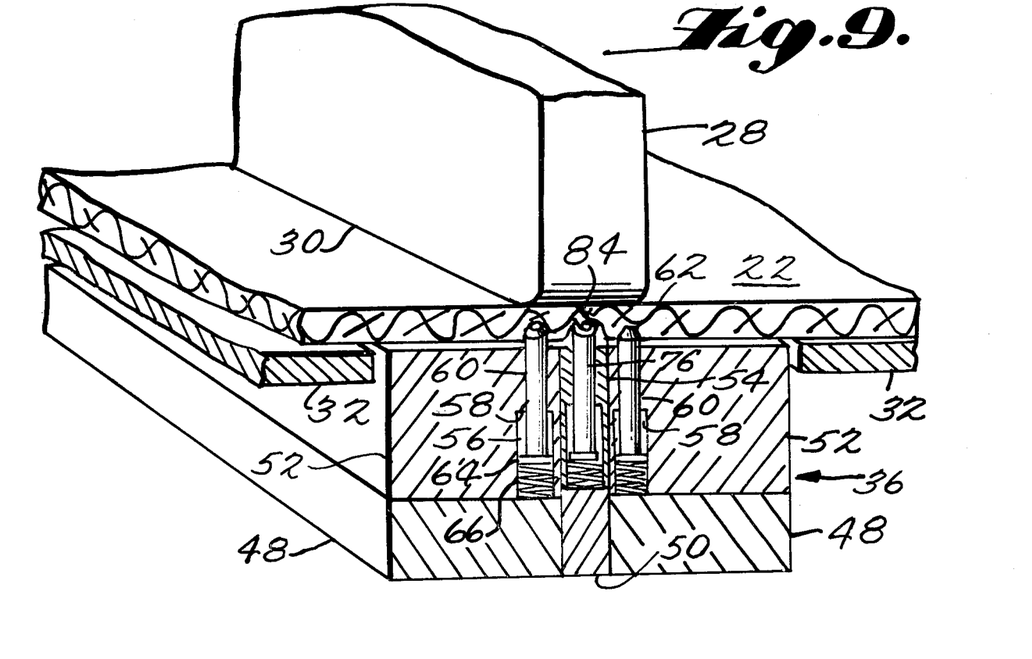
FIG. 9 is a perspective view similar to FIG. 8 but illustrating the horn in its engaged position where the cutter wire is cutting the sheet material and the anvil pins are seaming the edges formed during the cutting.
Figure 10:
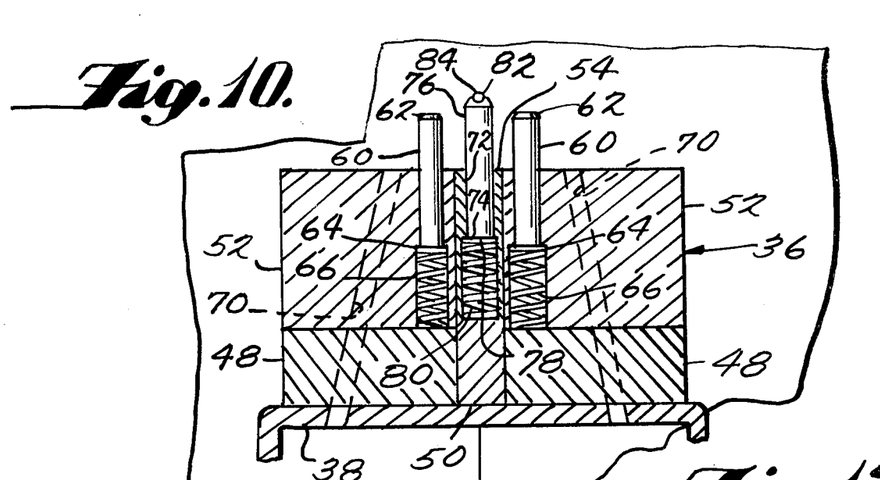
FIG. 10 is an enlarged fragmentary sectional view taken on the line 10—10 of FIG. 2.
Figures 11, 12:
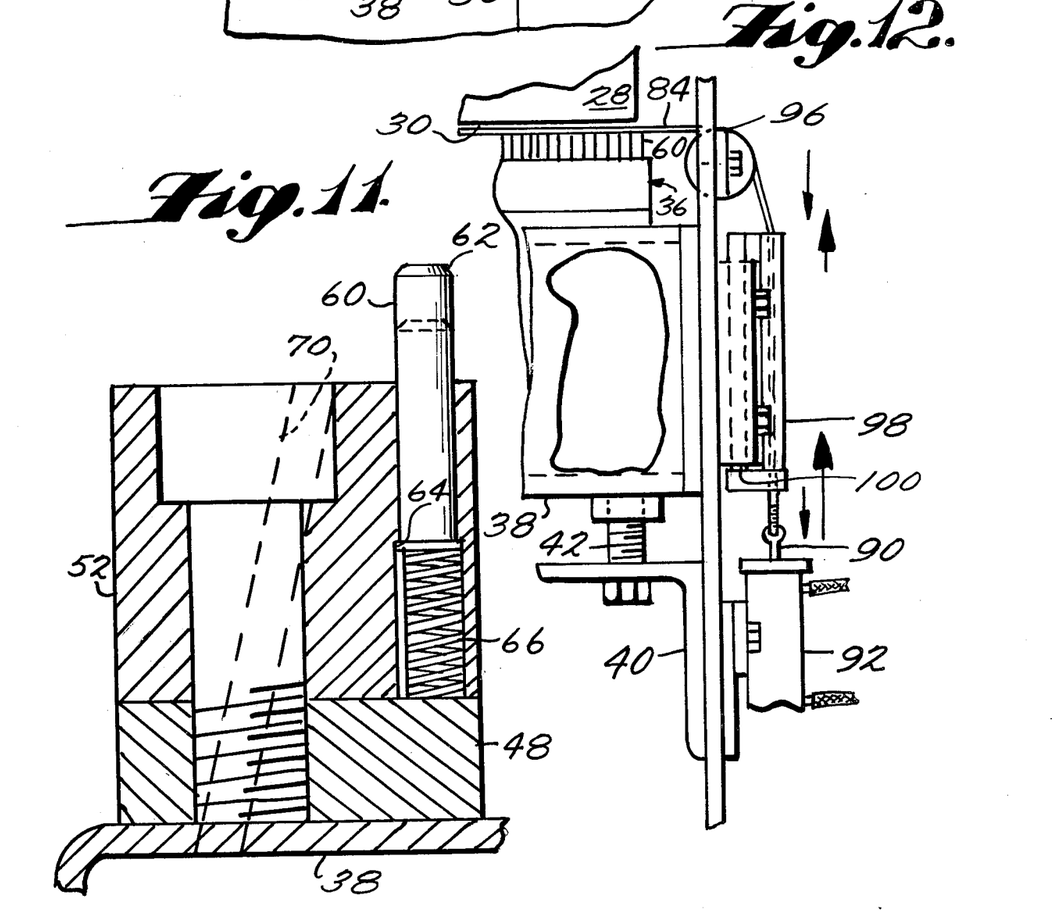
FIG. 11 is a still further enlargement of a portion of the sectional view of FIG. 10 and illustrating the mounting of one of the anvil pins.
FIG. 12 is an enlarged fragmentary view taken on the line 12—12 of FIG. 6.

Each of the pattern bars 52 includes a plurality of holes 56 closely spaced to each other, each hole being stepped to provide a downwardly facing annular shoulder 58, as best shown in FIGS. 8 and 9. A plurality of anvil pins 60 having frusto-conical upper ends 62 extend upwardly in the holes 56, each pin 60 having a flange 64 on its lower end for cooperating with the shoulder 58 to limit the amount the anvil pin projects from the upper surface of the pattern bar 52. Coil springs 66 positioned between the flanges 64 and the upper surface of the pattern bar base plate 48 bias the anvil pins 60 to their uppermost position to provide a predetermined gap between them and the frontal surfaces 30 of the horns 28 when the horns are in their operating position. It will be noted by reference to FIGS. 8, 10 and 11, the pattern bar 52, pattern bar base plate 48 and tubular member 38, which are bolted together, are provided with a plurality of drillings 70 therethrough and, as previously mentioned, the drillings 70 provide communication with the interior of the tubular member 38 so that air under pressure from the tubular member 38 can be ejected upwardly against the undersurface of the sheet material 22 after a cut has been made so as to remove the sheet material 22 from the anvil pins 60 when the sheet material 22 is being advanced for the next cut. The drillings 70 are spaced transversely across the anvil means 36 so that the entire edges formed can be lifted off the anvil pins 60.

The cutter bar 54 is similarly provided with a plurality of stepped holes 72, the stepped holes being provided with a downwardly facing annular flange 74. Cutter pins 76, each having a flange 78 at the lower end, project out of the holes 72 with the flanges 78 engaging the shoulders 74 to limit the amount of projection. Springs 80 positioned between the flanges 78 of the pins 76 and the upper face of the cutter bar base plate 50 urge the pins 76 outwardly to a predetermined position slightly higher than the position of the anvil pins 60. Each of the pins 76 is provided on its upper end with a groove 82 for receiving a cutter wire 84, the cutter wire 84 being fixedly attached at one end to one of the vertical standards 16 as shown at 86 with its other end being adjustably attached as shown at 88 to a piston rod 90 of a pneumatic or air cylinder 92. The pneumatic or air cylinder 92, which controls tension of the cutter wire 84 by a pressure regulator 94, is operatively connected to the sequence control unit SCU, the unit supplying air to the cylinder when the apparatus is operating. A predetermined tension in the cutter wire assists in eliminating harmonics being set up in the wire during operation. Harmonics being set up in the cutter wire 84 by the vibrational energy produced in the horns is further avoided by making the cutter bar 54 in separate short lengths. FIGS. 6 and 7 disclose in detail the attachment of the cutter wire 84 to the air cylinder 92. In this respect, it will be noted that the end of the cutter wire 84 which passes over a wire guide 96 is attached to the end of a block 98 slidably mounted in a bracket 100 carried on the vertical standard 16. The block 98, in turn, is connected to the piston rod 90 of the air cylinder 92. When it is desired to adjust the tension in the cutter wire 84, it can be easily done by adjusting the pressure regulator 94 which controls the amount of pressure applied to the cylinder. The pneumatic or air cylinder 92 is shown as a double acting cylinder, but it could be a single acting cylinder with a spring return.

As previously mentioned, the plurality of electroacoustical converter units 26 are operatively mounted on the channel-shaped plate 24 which is carried by the frame structure 12. In more detail, the vertical standards 14 are provided with brackets 102, the brackets 102 carrying levelling screws or studs 104 which are threaded into the bottom of the support plate 24. Consequently, all of the electro-acoustical converter units 26 can be properly levelled with respect to the anvil means 36 which itself can be levelled by adjustment of the levelling screws or studs 42 of the tubular member 38.

The channel-shaped plate 24 supports at least a pair of horizontally extending Thomson-type SR-16 support or carrier rails 106 and 108 by means of support blocks 110 bolted to the plate member 24. A main assembly plate 112 having Thomson SPB open pillow blocks 114 bolted thereto is adapted to slide horizontally on the carrier rails or shafts 106 and 108. The carrier plate 112, in turn, supports a plurality of U-shaped air cylinder and horn assembly mount brackets 116, there being one bracket for each electro-acoustical converter unit 26. Each U-shaped bracket 116, in turn, carries a slidably mounted converter mount bracket 118 which can move vertically with respect to the bracket 116. Bracket 118 can have a tongue and groove arrangement with bracket 116 to provide for the vertical movement of the same with respect to the bracket 116. Pneumatic or air cylinders 120 are mounted on each of the U-shaped brackets 116, the cylinders 120 having their piston rods 122 extending vertically downwardly and connected to the bracket 118 which supports the electro-acoustical converter units 26. Pneumatic cylinders 120 each has its own individual pressure regulator 124 and all of the cylinders 120 are then, in turn, connected to a manifold 126, the pressure in the manifold 126 being controlled by the sequence control unit SCU.

Support plate 112 which can move horizontally on the rails 106 and 108 is connected at 130 to a piston rod 132 of a horizontally mounted pneumatic or air cylinder 134, the cylinder 134 also being connected to the sequence control unit SCU through the individual pressure regulator 136 which controls the speed of the stroke of its piston.

As will now be evident, the electro-acoustical converter units 26 and their horns 28 can be moved back and forth horizontally as well as up and down vertically, with the vertical movement of the horns being simultaneous but individually adjustable. To obtain the individual adjustment of the electro-acoustical converter units 26 and their horns 28, the U-shaped mounting bracket 116 (FIG. 5a) is provided with a threaded stud 138 extending upwardly, the stud 138 having an integral enlargement thereon at 140 and a projection 142 which extends upwardly into a hole 144 provided in the lower edge of the vertically slidable mount bracket. A plurality of Belleville washers 146 which have a high cumulative spring constant in the range of 80,000 pounds per inch to 100,000 pounds per inch, and preferably in the order of 90,000 pounds per inch is interposed between the enlargement 140 and the lower edge of the mounting bracket 118. The unit just described provides a stop means to limit the downward movement of the horn 28, and by adjusting the stud 138, the gap between the frontal surface 30 of a horn 28 and the opposing anvil means 26 can be accurately adjusted. The enlargement 140 is provided with a plurality of depressions 148 for receiving a spanner wrench when an adjustment of gap is necessary.

The gap between the upper end of the anvil pins 60 and the frontal surface 30 of the horns is initially set by adjusting the studs 138 when the horns 28 are in their lowermost and operating position. This gap will be determined by the thickness of the sheet material to be exposed to vibrational energy, the amount and type of fusible components in the sheet material and/or the amount and kinds of nonfusible and fusible components when the sheet material is a blend, such as wool and nylon, cotton and nylon, or the like. Initially, the gap between the upper surface of the anvil pins 60 and the frontal surface 30 of the horns 28 is set in a range of 0.003 inch to 0.006 inch, with the gap being preferably at 0.004 inch. With regard to the gap between the anvil cutter wire 84 and the frontal surface 30, it will be in the order of 0.001 inch once the gap has been set between the anvil pins 60 and the frontal surface. It will be appreciated that the gap between the cutter wire 84 and the frontal surface, when the horn is operating and is vibrating up and down at approximately ±0.0025 inch, the frontal surface 30 of the horn will almost or just touch the cutter wire 84 so that the sheet material 22 can be completely severed therethrough. However, the gap between the anvil pins 60 and the frontal surface 30 of the horns 28 is more critical as this gap controls the type and quality of fusion bonds being made. It is initially set as described above, but when the electro-acoustical converter unit is operating, the high frequencies of vibration in the horns 28 result in heat being developed in the horns, thus causing a lengthwise elongation of the horns and a change in the gap. Additionally, extended running times or when there are material changes in temperature within the room of the plant where the apparatus 10 is located, also results in changes in dimensions of both the anvil means and the horns. If after the apparatus 10 is operating and it is observed that the fusion bonds being made for the seams along the edges of the material cut are not satisfactory and uniform, then the gap may be further controlled by adjusting the individual pressure regulators 124 for the particular pneumatic cylinders 120 of the electro-acoustical converter units 26. Increasing the fluid pressure for extending the piston rod 122 of the pneumatic cylinder 120 will cause a reduction in the gap whereas on the other hand a decrease in fluid pressure will cause an increase in the gap as the Belleville washers 146 cooperate to permit such further minute or fine adjustment.

The operation of the apparatus 10 just previously described will follow. As explained above, the gaps between the anvil pins and the frontal surfaces 30 of the horns 28 are initially set when the horns are in their lower position. Once this has been accomplished, then the horns are returned to their upper position and the apparatus is ready for operation. The sheet material 22 is fed to the cutting station beneath the horns 28 where the cut is to be made and the cycle of operation then begins. First, when the apparatus is turned on, the sequence control unit SCU will cause fluid pressure to be applied to the pneumatic cylinder 92 so that a predetermined tension can be set up in the cutter wire 84. Pressure is maintained on the cylinder 92 until at least the complete cut is made. At the same time, the sequence control unit SCU will supply fluid pressure through the manifold 126 to all of the cylinders 120, and this will cause all of the piston rods of the cylinders to simultaneously move vertically downwardly so as to move all of the electro-acoustical units 26 into their operating position, the units being activated when this is done. This will cause a cut in the sheet material beneath each horn and also a simultaneous fusion bonding by the anvil pins beneath each horn to provide a seam along the edges formed by the cut. However, each horn must be slightly spaced from an adjacent horn, and in this respect the spacing or gap between adjacent horns is 0.020 inch. In order to make a cut in the material in the space between adjacent horns, the horns are moved horizontally, and the sequence control unit SCU, at the proper time, will cause the piston rod 132 to move to the right of FIG. 2 a short distance, this causing the main assembly plate 112 to move horizontally to the right and since it carries all of the electro-acoustical units 26, all of such units will move to the right.

Figures 3, 4:
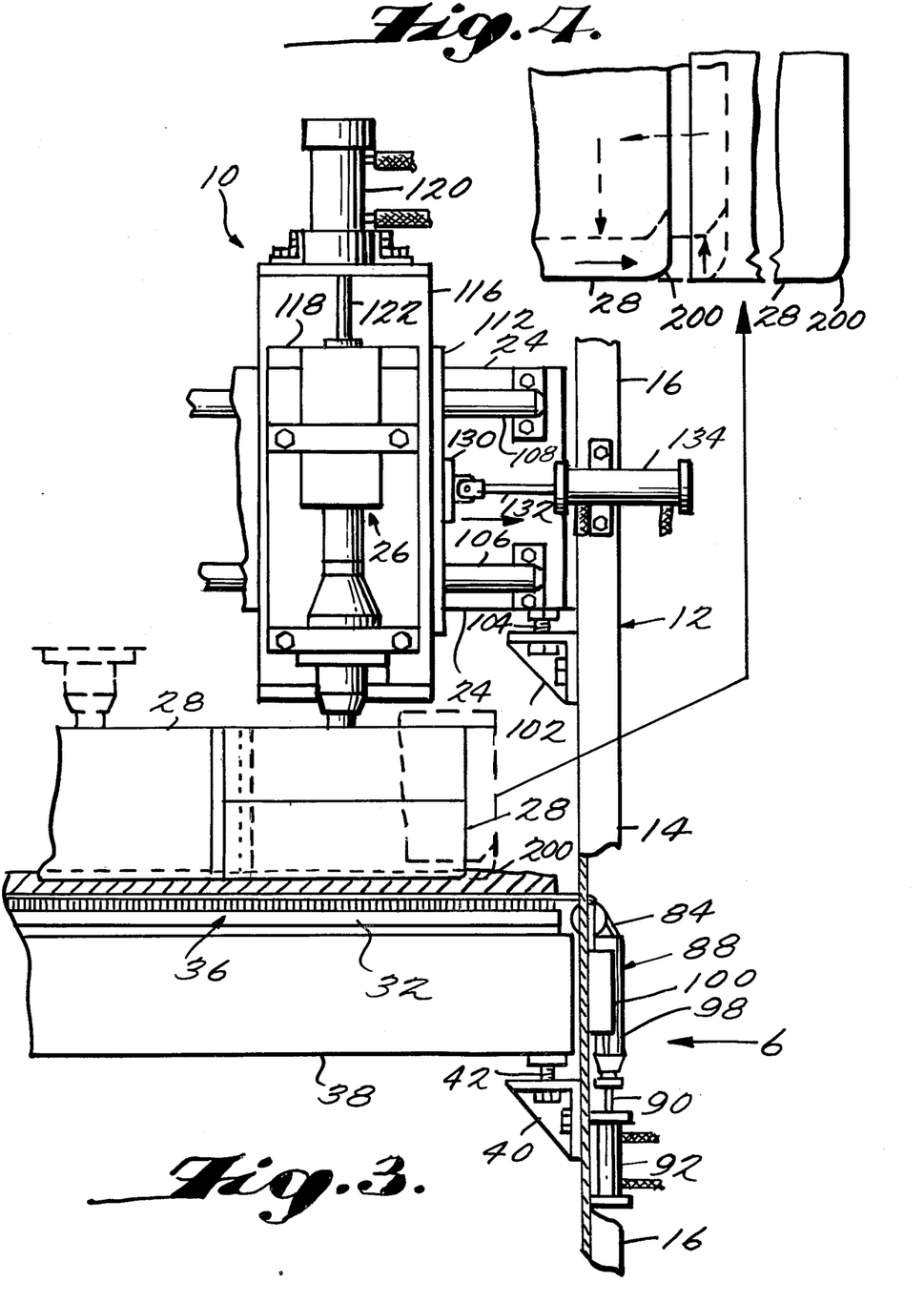
FIG. 3 is a fragmentary view of a portion of FIG. 2, the view illustrating in broken lines the movement of the electro-acoustical converter units and their horns.
FIG. 4 is an enlarged fragmentary view illustrating the movement of two adjacent horns.

As will be appreciated, each of the anvil pins 60 is biased upwardly to a predetermined position, and the cutter wire 84 is also held in position by support pins 76 similarly biased upwardly. Consequently, the leading edge 200 of each of the horns 28 is rounded so as to provide for smooth horizontal movement over the pins, the rounded portion 200 having a radius of approximately 0.50 inch or less. To take care of any portion of sheet material 22 which has not been cut or seamed by the vertical downward movement of the horns 28, the horns are then moved horizontally by the cylinder 134 a short increment equal to the radius of the curved end 200, i.e., 0.50 inch plus the gap between adjacent horns, namely, a 0.02 inch for a movement of about 0.520 inch. When this horizontal movement has been made, the sequence control unit SCU will then cause the fluid pressure to be relieved in the manifold line 126 so that the pistons 122 are retracted vertically upwardly to raise all of the horns 28 off of the cut sheet material 22, and then the sequence control unit SCU activates the air cylinder 134 to move all of the electro-acoustical converter units 26 to the left of FIG. 2 back to their indexing position ready for another operation when the next is to be made. FIGS. 3 and 4 disclose the movement of the horns during a complete cycle of operation which results in cutting and simultaneously seaming the edges of the sheet material cut.

Just as the horns are raised vertically off of the material, the sequence control unit SCU supplies air under pressure through the line 46 into the interior of the tubular member 38. From the tubular member 38, the air passes out the plurality of passages 70 in jet streams against the undersurface of the cut sheet material 22 to lift the same off of the anvil pins 60 so as to permit the sheet material to be advanced for another cut.

Figures 21, 22, 23:
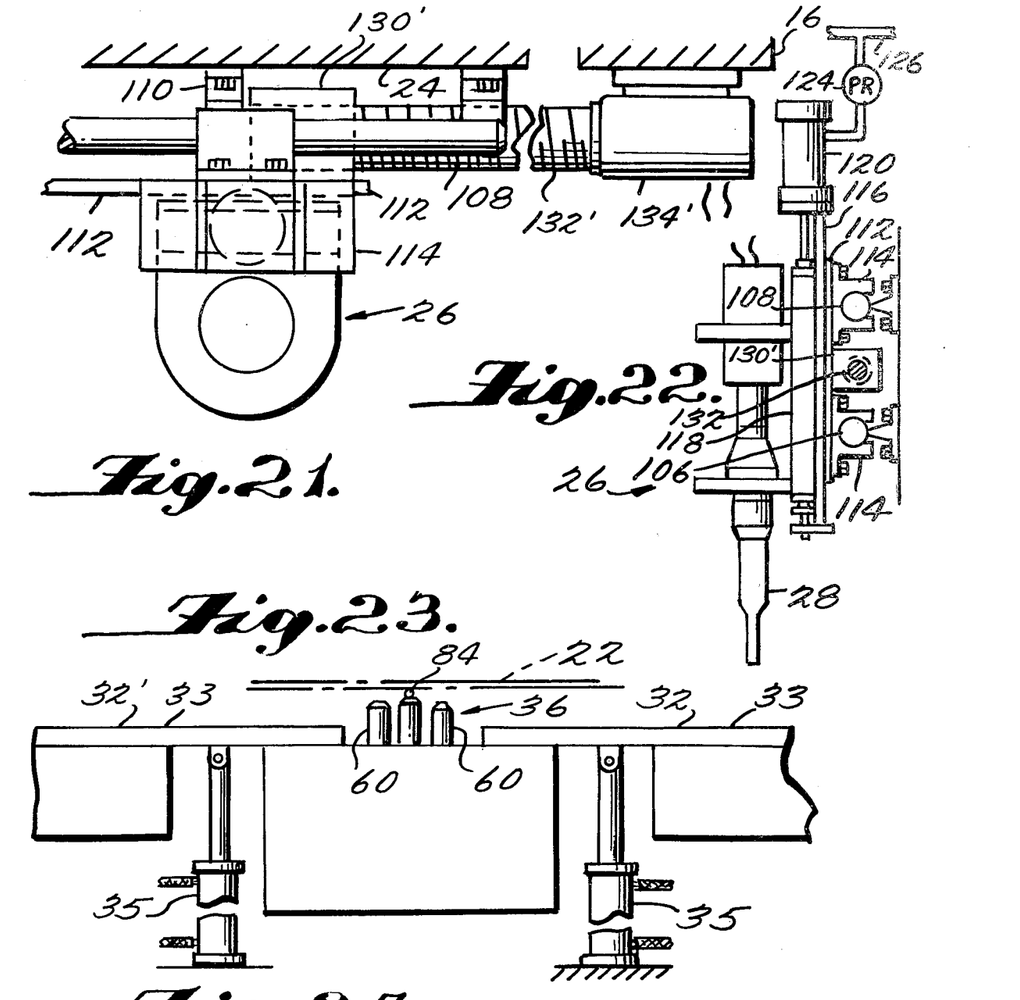
FIG. 21 is a fragmentary top plan view of a modified means for moving the electro-acoustical converter units and their horns horizontally.
FIG. 22 is a side elevational view on a reduced scale of the unit shown in FIG. 21 with portions thereof being omitted for the purpose of clarity.
FIG. 23 is a schematic view illustrating a modified form of means for supporting the sheet material and then removing the sheet material from the anvil means after the cutting and seaming or welding.

Referring now to FIGS. 21 and 22, there is disclosed a modification for moving all of the electro-acoustical converter units 26 horizontally back and forth. Instead of using the pneumatic cylinder 134 as disclosed in the description of the apparatus shown in FIGS. 1, 2 and 3, a reversible electronic motor 134' is supported on the vertical standard 16, the controls for the electric motor being actuated by the sequence control unit SCU. The reversible electric motor is provided with a threaded shaft or worm 132' which has an end carried by a screw rod bracket or pillow block 130' fixedly secured to the plate member 112. It will be noted that the pillow block 130' is supported on the plate member 112 intermediate the pillow blocks 114, and since the rods 108 and 106, and their pillow blocks 114, carry the vertical load exerted by the electro-acoustical converter units 26 and their horns 28, the shaft or worm 132' assumes no vertical load and its rotation in one direction or the other by the electric motor 134' can exert the horizontal force necessary to move the assembly horizontally back and forth in the cycle operation. The arrangement shown in FIGS. 21 and 22 provides better speed control and is more accurate than the pneumatic cylinder arrangement previously described, although both arrangements can work satisfactorily.

Figure 24:
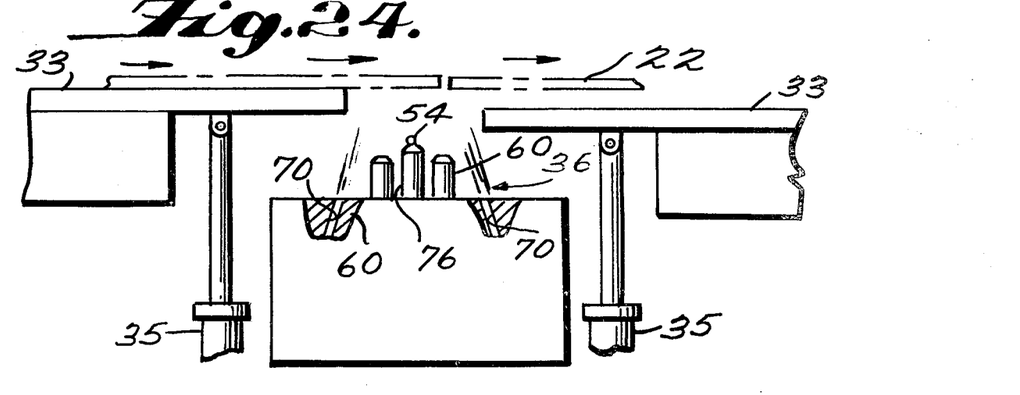
FIG. 24 is a view similar to FIG. 23 but showing the sheet material support means moved to its upper position.

Referring now to FIGS. 23 and 24, there is disclosed a further modification of the present invention for assisting in the removal of the cut sheet material 22 from the anvil means 36. In this arrangement, instead of having the platform surface 32 fixed relative to the frame structure 12, a vertically movable platform surface 32' is utilized, this platform surface comprising two smooth formica top boards 33 positioned on either side of the anvil means 36. Suitable means such as pneumatic cylinders 35, which are controlled in proper sequence by the sequence control unit SCU, are utilized to raise and lower the respective formica top boards. In more detail, and as shown in FIG. 23, the sheet material 22 has been moved to a position where it is desired to make a cut transversely of the same by the cutter wire 84 and to seam the sides or edges formed by the cutter by utilizing the anvil pins 60. The horn 28 will descend vertically to accomplish this operation and will more horizontally to complete the cut, and then vertically and return horizontally to the indexing position. When this is accomplished and the cut is complete, the boards 33 are lifted vertically as shown in FIG. 24, the boards being lifted by means of the pneumatic cylinders 35. This will lift the cut sheet material off of the anvil means 36 and permit the sheet material to be advanced so that it may be indexed for the next cut. It should be noted that the board 33 which is on the right or downstream side of the anvil means 36 at the cutting station does not raise to as high a position as the board on the left or upstream side, and this further assists in preventing the cut leading edge from being entangled therewith when the sheet material 22 is advanced to a position for the next cut. It will be noted that the anvil means and, more particularly, the cutter and pattern mount bars may still be provided with air passages 70 leading from the interior of the tubular member 38. As explained previously, these air passages also assist in removing the cut edges from the anvil means but they can be further utilized to provide cooling for the anvil means and for the horn if so desired.

It will be apparent from the above description of the apparatus 10 that the cutting and seaming operation which is accomplished simultaneously is much faster than in the operation when a single electro-acoustical converter unit is used to cooperate with a cutter and anvil means with both the unit and the anvil means being moved transversely across the entire width of the sheet material. In other words, in the present invention the sheet material is cut and seamed in substantially one operation with only a very short increment of movement horizontally to take care of cutting in the spaces between adjacent horns. This permits considerable saving in time when finishing the textile fabric into products such as blankets.

The terminology used throughout this specification is for the purpose of description and not limitation, the scope of the invention being defined by the appended claims.

What is claimed is:

1. An apparatus for simultaneously cutting sheet material having a heat fusible component disposed therein and seaming at least one of the edges formed by exposing the sheet material to high frequency vibrational energy, said apparatus comprising:
    a frame structure through which the sheet material is fed from a source, stopped and then upon which the cutting and seaming is accomplished;
    a horizontally movable support member carried by said frame structure above the sheet material;
    a plurality of electro-acoustical converter units horizontally spaced in juxtaposition to each other in line transversely above the sheet material, said plurality of electro-acoustical converter units being operatively mounted on said support member for vertical movement with respect thereto, each of said electro-acoustical converter units being energized by high frequency electrical energy and converting the same to high frequency vibrational energy and each having a horn resonant at the high frequency vibrational energy, each said horn having a frontal surface for imparting the high frequency vibrational energy to the sheet material when in contact therewith;
    means to move said horns vertically downwardly into engagement with and vertically upwardly out of engagement with the sheet material;
    stationary anvil means disposed transversely beneath the sheet material and opposing the frontal surfaces of said in-line horns, said anvil means including at least a first set of closely spaced resiliently mounted pins in line with each other for seaming at least one cut edge of the sheet material and a cutter member adjacent to the in-line pins and extending transversely of the sheet material for severing the sheet material when the sheet material is engaged by said horns;
    and means to move said support means and the horns mounted thereon back and forth in a small horizontal increment, the frontal surfaces of said horns being in engagement with the sheet material in one direction of horizontal movement and out of engagement with the sheet material in the other direction of horizontal movement.

2. An apparatus as claimed in claim 1 in which each of the frontal surfaces of said horns is elongated in a direction transverse to the sheet material and in which each horn has a leading bottom end slightly rounded, the slightly rounded bottom end of each horn allowing the same to be moved horizontally while in engagement with the sheet material.

3. An apparatus as claimed in claim 2 in which said means to move said support member and the horns mounted thereon back and forth in a small horizontal increment includes means to control a distance of horizontal movement to a sum of a space between adjacent horns plus at least a distance equal to a radius of curvature of the rounded bottom end of the horn.

4. An apparatus as claimed in claim 3 in which said means to move said support member and the horns mounted thereon back and forth in the small horizontal increment is an air cylinder operatively carried on said frame and having its piston rod operatively connected to said support member.

5. An apparatus as claimed in claim 3 in which said means to move said support member and the horns back and forth in the small horizontal increment includes a reversible electric motor operatively carried on said frame structure, a threaded shaft rotatable by said electric motor and a threaded pillow block operatively carried by said support member for receiving said threaded shaft.

6. An apparatus as claimed in claim 1 in which said cutter member includes a wire supported by a row of a plurality of resiliently mounted pins in line with each other and extending transversely of the sheet material, and means for adjusting the tension of said wire.

7. An apparatus as claimed in claim 6 in which said means for adjusting the tension of said wire includes means for fixedly mounting one end of said wire to one side of said frame structure and means to adjustably mount the other end of said wire to the other side of said frame structure, said means for adjustably mounting said wire including pneumatic means for controlling the tension of said wire.

8. An apparatus as claimed in claim 7 including a second set of closely spaced resiliently mounted pins in line with each other and extending transversely of the sheet material on an opposite side of said wire from said first set, said second set of closely spaced resiliently mounted pins being provided for seaming another edge formed when the sheet material is cut.

9. An apparatus as claimed in claim 8 including means for assisting the removal of the cut sheet material upwardly off the resiliently mounted pins of said first and second sets and upwardly off said wire when the sheet material is advanced after a cut.

10. An apparatus as claimed in claim 9 in which said means for assisting in removal of the sheet material upwardly off of said sets of resiliently mounted pins and said wire includes pneumatic means for directing a blast of air upwardly against an underneath surface of said sheet material.

11. An apparatus as claimed in claim 10 in which said means for assisting in removal of the sheet material from the sets of resiliently mounted pins and the wire further includes a pair of material support boards on either side of said anvil means, and means for moving said support boards vertically upwardly after the sheet material has been cut.

12. An apparatus as claimed in claim 9 in which said means for assisting in removal of the sheet material upwardly off of said sets of resiliently mounted pins and said wire includes a pair of material support boards on either side of said anvil means, said boards including means to move the same vertically to lift the cut material off of the anvil means during indexing of the sheet material.

13. An apparatus as claimed in claim 12 in which one of said boards moves to a higher vertical elevation than the other of said boards, said one board being on a side of the anvil means in a direction from which the sheet material is fed.

14. An apparatus as claimed in claim 1 in which said means to move said horns vertically downwardly and vertically upwardly includes an air cylinder for each electro-acoustical converter unit and including stop means to individually adjust the downward position of said horns.

15. An apparatus for providing an elongated seam transversely across sheet material having a heat-fusible component disposed therein by exposing the sheet material to high frequency vibrational energy, said apparatus comprising:

a frame structure for receiving the sheet material and having a station therein in which the seaming is accomplished;

a plurality of electro-acoustical converter units operatively supported on said frame structure and horizontally spaced in juxtaposition to each other in line transversely above the sheet material, each of said electro-acoustical converter units being energized by high frequency electrical energy and converting the same to high frequency vibrational energy, and each having a horn resonant at the high frequency vibrational energy, said horns being closely spaced to each other in line transversely of the sheet material, and each horn having an elongated frontal surface in line with the frontal surfaces of the other horns and for imparting the high frequency vibrational energy to the sheet material when in engagement therewith;

means to move said horns from an initial position vertically downwardly into engagement with the sheet material and then horizontally while in engagement with the sheet material and then vertically upwardly out of engagement with the sheet material and horizontally back to the initial position; and stationary anvil means disposed beneath and extending transversely of the sheet material and opposing the frontal surfaces of said in-line horns, said anvil means including a plurality of closely spaced in-line anvil pins projecting upwardly towards and supporting said sheet material, and each of said anvil pins biased upwardly a predetermined distance.

16. An apparatus as claimed in claim 15 in which said anvil means includes an elongated member extending transversely of said frame structure, an anvil pin mounting bar carried by said elongated member, said pin mounting bar including a plurality of holes drilled therein for reception of said pins, and spring means in said holes biasing said pins upwardly to the predetermined distance.

17. An apparatus as claimed in claim 16 in which said elongated member is hollow and in which said pin mounting bar is provided with a plurality of holes therethrough extending from its upper surface and communicating with the hollow interior of said elongated member, and means for supplying air under pressure to the hollow interior of said elongated member and through the holes in said anvil pin mounting bar for lifting the sheet material from said pins after seaming.

18. An apparatus as claimed in claim 16 in which each of said plurality of pin holes in said pin mounting bar is stepped to provide a downwardly facing shoulder and in which each of said pins is provided with a flange at its lower end for engaging said shoulder and limiting extension of said pins upwardly to the predetermined distance.

19. An apparatus as claimed in claim 18 in which said elongated member is hollow and in which said pin mounting bar is provided with a plurality of holes therethrough extending from its upper surface and communicating with the hollow interior of said elongated member, and means for supplying air under pressure to the hollow interior of said elongated member and through the holes in said anvil pin mounting bar for lifting the sheet material from said pins after seaming.

20. An apparatus as claimed in claim 15 in which each horn has a leading bottom end which is slightly rounded, the slightly rounded bottom end of each horn allowing the same to move horizontally while in engagement with said sheet material over said anvil pins.

21. An apparatus as claimed in claim 20 in which horizontal movement of said horns while in engagement with said sheet material is equal to a sum of a space between adjacent horns plus at least a distance equal to a radius of curvature of the rounded bottom end of one horn.

22. An apparatus as claimed in claim 21 in which said means to move said horns includes a first means for moving said horns vertically downwardly into engagement with the sheet material and vertically upwardly out of engagement with the sheet material, and a second means to move said horns horizontally back and forth.

23. An apparatus as claimed in claim 22 in which said second means to move said horns horizontally back and forth includes a horizontally movable support member carried by said frame structure and upon which said plurality of electro-acoustical converter units are mounted, and an air cylinder operatively carried on said frame structure and having its piston rod extending horizontally and connected to said support means.

24. An apparatus as claimed in claim 22 in which said second means to move said horns back and forth horizontally includes a horizontally movable support member carried by said frame structure and upon which said plurality of electro-acoustical converter units are mounted, a reversible electric motor operatively carried on said frame structure, a threaded shaft rotatable by said motor, and a threaded pillow block operatively carried by said support member for receiving said threaded shaft.

25. An apparatus as claimed in claim 16 in which said anvil means further includes means for cutting the sheet material transversely of the same adjacent the seam being formed therein by said anvil pins.

26. An apparatus as claimed in claim 25 in which said cutter means includes a cutter bar member mounted on said elongated member adjacent said anvil pin mounting bar, said cutter bar member having a plurality of holes therein, a plurality of outwardly biased pins mounted in said holes and extending outwardly of said cutter bar member toward the frontal surfaces of said horns, and a wire carried on the outer ends of said last-mentioned pins and extending transversely across said frame structure, and means for adjusting the tension of said wire to assist in compensating for harmonics set up in said wire by the high frequency vibrational energy during a cutting operation.

27. An apparatus as claimed in claim 26 in which each of said pins carried by said cutter bar member is provided with a groove on its outer end to receive said wire.

28. An apparatus as claimed in claim 27 in which said holes in said cutter bar member are stepped and provide a downwardly facing shoulder and in which each of said pins received in the holes of said cutter bar member is provided with a flange at its lower end for engaging the shoulder and limiting the outward movement of the pins, said pins in said cutter bar member being biased outwardly by a spring operatively carried between said cutter bar member and said support member.

29. An apparatus as claimed in claim 28 in which said means for adjusting tension of said wire includes means for fixedly mounting one end of said wire to one side of said frame structure and means to adjustably mount the other end of said wire to the other side of said frame structure, said means for adjustably mounting said wire including pneumatic means for controlling the tension of said wire.

30. An apparatus as claimed in claim 29 wherein said cutter bar member includes a plurality of separate in line elements of predetermined lengths to further assist in compensating for harmonics set up in said wire by the high frequency vibrational energy imparted thereto by said horns, each of said separate in line elements being individually mounted on said elongated member.

31. An apparatus as claimed in claim 30 including a second anvil pin mounting bar carried by said elongated member and extending transversely of said frame structure on an opposite side of said cutter bar member with respect to said first-mentioned anvil pin mounting bar, said second anvil pin mounting bar including a plurality of holes drilled therein for reception of a plurality of pins, and spring means in said holes for biasing said last-mentioned pins upwardly a predetermined distance.

32. An apparatus for making an elongated transverse cut in sheet material having a heat-fusible component disposed therein by exposing the sheet material to high frequency vibrational energy, said apparatus comprising:
 a frame structure for receiving the sheet material and having a station therein in which the sheet material is cut transversely of the same;
 a plurality of electro-acoustical converter units operatively supported on said frame structure and horizontally spaced in juxtaposition to each other in line transversely above the sheet material, each of said electro-acoustical converter units being energized by high frequency electrical energy and converting the same to high frequency vibrational energy and each having a horn resonant at the high frequency vibrational energy, said horns being closely spaced to each other in line transversely of the sheet material, and each horn having an elongated frontal surface in line with frontal surfaces of other horns and for imparting the high frequency vibrational energy to the sheet material when in engagement therewith;
 means to move said horns from an initial position vertically downwardly into engagement with the sheet material and then horizontally a small increment while in engagement with the sheet material and then vertically upwardly out of engagement with the sheet material and horizontally back to the initial position; and stationary anvil means disposed beneath and extending transversely of the sheet material and opposing the frontal surfaces of said in-line horns, said anvil means including a cutter wire extending transversely of the frame structure, and means for adjusting the tension of said cutter wire to assist in compensating for harmonics set up in said cutter wire by the high frequency vibrational energy during cutting operation.

33. An apparatus as claimed in claim 32 in which said stationary anvil means includes an elongated member extending transversely of said frame structure, a cutter bar member mounted on said elongated member, said cutter bar member having a plurality of holes therein, and a plurality of outwardly biased pins mounted in said holes and extending outwardly of said cutter bar member for supporting said cutter wire above said cutter bar member at a predetermined distance from the frontal surfaces of said horns when said horns are in engagement with the sheet material.

34. An apparatus as claimed in claim 33 in which each of said pins carried by said cutter bar member is provided with a groove on its outer end to receive said cutter wire.

35. An apparatus as claimed in claim 34 in which said holes in said cutter bar member are stepped and provide a downwardly facing shoulder and in which each of said pins received in the holes of said cutter bar member is provided with a flange at its lower end for engaging the shoulder and limiting the outward movement of the pins, and means for biasing said pins outwardly of said cutter bar member to a position where the flanges of said pins engage said shoulders.

36. An apparatus as claimed in claim 35 in which said biasing means includes a spring in each hole operatively carried between said cutter wire support pins and said elongated member.

37. An apparatus as claimed in claim 36 in which said means for adjusting tension of said cutter wire includes means for fixedly mounting one end of said cutter wire to one side of said frame structure and means to adjustably mount the other end of said cutter wire to the other side of said frame structure, said means for adjustably mounting said cutter wire including pneumatic means for controlling the tension in said cutter wire.

38. An apparatus as claimed in claim 37 wherein said cutter bar member includes a plurality of separate in line elements of predetermined lengths to further assist in compensating for harmonics set up in said wire by the high frequency vibrational energy imparted thereto by said horns, each of said separate in line elements being individually mounted on said elongated member.

39. An apparatus as claimed in claim 38 including means for providing a seam along each edge formed during the cutting operation.

40. An apparatus as claimed in claim 39 in which said means for forming a seam along each edge of the sheet material includes an anvil pin mounting bar positioned on each side of and adjacent said cutter bar member, each anvil pin mounting bar being mounted on said elongated member and including a plurality of holes drilled therein for reception of pins, and spring means in said holes for biasing said pins upwardly to a predetermined distance.

41. An apparatus as claimed in claim 40 in which said anvil pins in said anvil pin mounting bars have frusto-conical end portions and in which said anvil pins, when fully extended, are lower than said cutter wire.

* * * * *